United States Patent [19]

Carfagnini

[11] Patent Number: 4,835,204
[45] Date of Patent: May 30, 1989

[54] PLASTO-ELASTOMERIC COMPOSITIONS FROM POLYOLEFINS AND EPDM TERPOLYMERS

[75] Inventor: Italo Carfagnini, Forli', Italy

[73] Assignee: SO.F.TER. S.p.A., Forli', Italy

[21] Appl. No.: 197,085

[22] Filed: May 20, 1988

Related U.S. Application Data

[63] Continuation-in-part of Ser. No. 937,369, Dec. 3, 1986, abandoned.

[30] Foreign Application Priority Data

Dec. 20, 1985 [IT] Italy .................................. 3656 A/85

[51] Int. Cl.$^4$ .......................... C08K 5/09; C08L 61/08
[52] U.S. Cl. ..................................... 524/291; 525/133; 525/139
[58] Field of Search ................ 524/291; 525/139, 133, 525/141, 140

[56] References Cited

U.S. PATENT DOCUMENTS

| | | | |
|---|---|---|---|
| 3,752,780 | 8/1973 | Petersen | 525/141 |
| 3,878,150 | 4/1975 | Lohr, Jr. | 524/291 |
| 4,477,631 | 10/1984 | Danesi | 525/133 |

Primary Examiner—Christopher Henderson
Attorney, Agent, or Firm—Balogh, Osann, Kramer, Dvorak, Genova & Traub

[57] ABSTRACT

A plasto-elastomeric composition is described comprising thermoplastic olefinic resins and EPDM elastomers wherein the elastomeric phase is fully or partially cross-linked by means of an aromatic carboxylic acid and a non-halogenated phenolic resin.

8 Claims, No Drawings

PLASTO-ELASTOMERIC COMPOSITIONS FROM POLYOLEFINS AND EPDM TERPOLYMERS

This is a continuation-in-part of copending application Ser. No. 937,369, filed on Dec. 3, 1986, now abandoned.

BACKGROUND OF THE INVENTION

The present invention relates to plasto-elastomeric compositions comprising thermoplastic olefinic resins and EPDM terpolymers as well as to the process for preparing the same.

The plasto-elastomeric compositions and their manufacturing are well-known in the art. Thus the preparation of thermoplastic compositions from 2-olefinic resins and elastomeric EPDM terpolymers was described for example in FR-2,408,632 and U.S. Pat. No. 3,849,773. For obtaining such compositions, in both the abovementioned patents it is suggested to employ a halogenated phenolic resin or a non-halogenated phenolic resin associated with halogendonors as crosslinking agents in order to achieve a satisfactory crosslinking rate.

From U.S. Pat. No. 4,477,631 it is known to combine the non-halogenated phenolic resin with metal oxides or carbonates thereby enhancing the processability when compared with that of both the patents mentioned above.

Further vulcanization techniques of the elastomer contained in the plasto-elastomeric compositions obtained from 2-olefinic plastomers and ethylene-propylene elastomers utilizing thermodynamic crosslinking, are described for example in DE-2.401.149, U.S. Pat. No. 3.322.360 and U.S. Pat. No. 3.884.882. The elastomeric copolymers, however, are here pre-grafted with maleic anhydride so as to crosslink and render them more compatible with the elastomeric materials contained in said compositions.

At last methods for obtaining plast-elastomeric compositions are also known having the elastomeric phase crosslinked by thermodynamic crosslinking and with the aid of crosslinking agents usually employed in the rubber field, such as sulfur, sulfur donors, organic peroxides, quinone derivatives, guanidines, maleimides, azides, sulfenazides, urea, xanthates, thiazoles, imidazoles, sulfenamides, amines, isocyanates, cyanurates and paraquinon dioxime (see UK-2.011.430, U.S. Pat. No. 3.806.558, U.S. Pat. No. 3.037.954, U.S. Pat. No. 3.758.643 and U.S. Pat. No. 3.862.106).

Common to all the compositions obtained by thermodynamic vulcanization are some disadvantages strongly limiting their use and/or the possibility of an easy manufacturing, such as the non homogeneous crosslinking of the rubbery phase because of the poor crosslinking agents dispersion in the whole plastoelastomeric composition at temperatures similar to or higher than the plastomer melting point, as at such temperatures the crosslinking (or curing) of the elastomeric fraction contained in said composition occurs. Other claimed processes foresee too long reaction times and excessively high crosslinking temperatures, which are not practicable in the industry.

SUMMARY OF THE INVENTION

Object of the present invention was accordingly to provide an improved process for obtaining new plasto-elastomeric compositions which avoids the disadvantages reported above and which results particularly in compositions exhibiting a better processability than the compositions already known in the art.

This object was surprisingly achieved with the present invention utilizing for thermodynamic crosslinking of the EPDM elastomer contained in the plast-elastomeric mixture a non halogenated phenolic resin combined with a selected aromatic carboxylic acid.

The present invention provides therefore new plasto-elastomeric compositions comprising EPDM and polyolefins having the elastomeric phase fully or partially crosslinked, characterized in that for crosslinking a non halogenated phenolic resin together with an aromatic carboxylic acid was employed. The non-halogenated phenolic resin used for crosslinking according to the present invention has the following general formula:

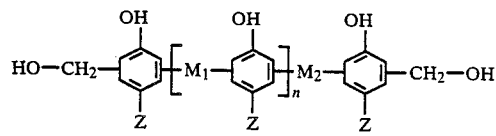

wherein
$M_1$ and $M_2$, which may be the same or different, are $-CH_2-$ or $-CH_2-CO-CH_2-$ radicals,
Z is an aryl or alkyl radical containing from 4 to 16 carbon atoms, and
n is an integer from 0 to 6.

The phenolic resin employable in the process of the present invention is preferably a phenol-formaldehyde resin of the resolic type corresponding to the formula

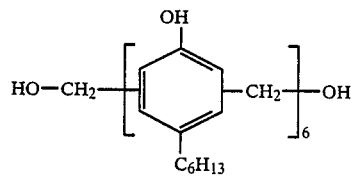

For achieving a satisfactory crosslinking, in addition to the non-halogenated phenolic resin it proved to be particularly suitable suitable to use salicyclic acid, i.e. an acid having the following characteristics:
Chemical formula: $HO-C_6H_4-COOH$
Molecular weight: 138.12
Melting point: 159° C.
Weight density: 1.37 g/cm$^3$.

The vulcanization system utilized in the present invention comprises therefore the combination of an alkylphenol-formaldehyde type resin, preferably a phenol-formaldehyde resin, and salicylic acid, wherein per each part by weight of resin from 0.1 to 0.8 parts by weight of salicyclic acid were employed.

DESCRIPTION OF THE PREFERRED EMBODIMENTS

The process of the present invention for preparing plastoelastomeric compositions comprises subjecting to mastication by means of conventional devices usually employed in plastics and/or rubber industry, such as Banbury mixers, continuos extruders, roll mixers, Buss mixers, etc., mixers containing from 10 to 80% by weight of EPDM terpolimer (comprising at least two 2-olefin monomers and at least a diene monomer) in the presence of a crosslinking system consisting of 0.5–15 parts by weight, per hundred parts of EPDM, of a non-halogenated phenolic resin and salicylic acid in the weight ratio of from 0.1:1 to 0.8:1. The reaction occurs at a temperature equal to or higher than (preferably higher) the melting point of the olefinic thermoplastic employed, and for a sufficient time to obtain a well homogenous blend and a partial or full (preferably full) crosslinking of EPDM rubbery phase contained in the mixture itself.

Such a procedure can be carried out in a single compounding apparatus as mentioned above or in more than one apparatus in suitable sequence, such as Banbury+extruder, dry turbomixer and twin screw extruder, Banbury+mixer, etc.

Whichever the apparatus choice may be, it is suitable to work dinamically and under time, temperature and rpm conditions so as to achieve the following working sequence:

(a) EPDM elastomer mastication and melting of the polyolefin plastomer;

(b) components homogenous dispersion;

(c) elastomeric phase crosslinking;

(d) homogenous dispersion of other additional additives.

With such a system it becomes possible to obtain a fine crosslinked EPDM elastomer dispersion within the "melted" plastomeric component and with the crosslinked elastomer in form of very small spheroidal particles having a diameter of from 0.1 to 1.5 microns.

Preferably it is suitable to work at temperatures of from 160° to 240° C., and mastication time depends on the following factors:

(a) crosslinking rate to be conferred to EPDM elastomer contained in the composition;

(b) diene amount (in % by weight) present in EPDM elastomer polymeric chain;

(c) weight amount of both the above-mentioned crosslinking agents (phenolic resin+salicylic acid).

As to the base components of the new compositions it is suitable to point out what follows:

(i) EPDM crosslinking rate: it ranges from 10 to 100% by weight of the total amount present in the composition.

The most preferred rate is from 50 to 98% by weight.

(ii) diene amount present in EPDM elastomer: said parameter is given by the insaturation rate and is generally expressed as diene amount per 100 parts by weight of the elastomer.

It can suitably range between 1 and 15% by weight. EPDM elastomers are preferred containing from 3 to 8% by weight of diene, based on total EPDM elastomer.

(iii) the phenolic resin amount to be utilized for EPDM elastomer dynamic crosslinking, ranges from 0.5 to 15 parts by weight per 100 parts by weight of EPDM, while using 0.05–12 parts of salicylic acid per 100 parts of EPDM (by weight).

In the thermodynamically crosslinked, plasto-elastomeric mixtures additives usually employed for such compositions may also be present, such as organic (carbon black) and inorganic (silica, silcates) charges, plasticizers (mineral oils, waxes, paraffins), fillers (carbonates, kaolin, talc, calcined clay, barite, asbestos, etc.), antioxidants, ozone and UV inhibitors, peptizers and antistickers, organic and inorganic pigments, curing aids.

All the components partecipating to the preparation of the plasto-elastomeric compositions of the present invention are well-known substances or they may be obtained according to well-known procedures. Only by way of example it is suitable to point out what follows.

With the term "EPDM terpolymers" as used herein, preferably amorphous polymers are intended consisting of ethylene and at least one 2-olefin (propylene, butene-1) and at least one diene coniugated or not coniugated in the main polymer chain and including: ethylidene-nor-bornene, 1,4-hexadiene, dicyclopentadiene, 2-methyl-1,4-pentadiene, 1,4,9-decatriene, 1,5-cyclooctadiene, 1-methyl-1,5-cyclooctadiene, 1,4-cyclopentadiene.

Such terpolymers have a molecular weight of from 50,000 to 800,000, a polyethylene mole content ranging from 20 and 80% and a bonded diene content of 1–15% by weight per 100 parts by weight of polymer, the remaining being constituted by an 2-olefin, such as polypropylene or polybutene-1.

With olefin plastomers are here copolymerization products of olefin monomers intended, such as: ethylene, propylene, butene-1 pentene-1, hexene-1, 4-methyl-1-pentene, 3-methyl-1-pentene, 3,3-dimethyl-1-butene, 3-methyl-1-hexene and 2,4,4-trimethyl-1-pentene.

The copolymerization of homogenous or non-homogenous monomers (i.e. random copolymers) is carried out in the presence of metallorganic compounds (catalysts), for example $AlEt_3$, $AlEt_3Cl$, $Al-i-Bu_3$, as well as of vanadium soluble derivatives (i.e. $VCl_4$, $VOCl_3$, $VAC_3$), wherein Et=ethylene, AC=acetylacetonate, i-Bu=Isobutyl).

With phenolic resin, as defined by the general formula reported above, those resins are intended which can be prepared condensing alkylphenols with formaldehyde, for example as described in literature (Kunstoffe, Band 52, S. 19–21).

The plasto-elastomeric compositions prepared according to the process of the present invention may be employed for obtaining artifacts which can be identified by but not limited to the following list:

(a) articles obtained by press-injection, press-transfer, press-compression and blow moulding techniques;

(b) articles drawn by means of extruders, including those utilized in the electrical field (primary and secondary conductive wire coatings for electrical energy transport);

(c) laminated or so-called sheet material obtained by calenders (two or more rolls) and utilized generally for damp- and weatherproofing);

(d) modification of other thermoplastic materials adding in any appropriate percentage amount the compositions prepared according to the present invention.

Such additives may be employed for enhancing the processability and/or grade characteristics of materials such as olefinic plastomers, natural and synthetic elastomers, bitumen, asphalts, lubricating oils, adhesives and amine polymers.

The compositions object of the present invention can be employed as solutions in organic solvents (in any solvent: solute weight ratio) for the treatment of natural and/or synthetic fiber fabrics, metal surfaces, cellulose, derivatives, non-woven fabrics, wood surfaces and concrete surfaces.

Several examples are set forth below to illustrate the nature of the invention as claimed and the manner of carrying it out. However, the invention should not be considered as being limited to the details thereof.

EXAMPLE 1

Operating in a 6 l Banbury mixer (rotor speed=45 rpm) and utilizing the following components in the amounts listed in Table 1 (runs A, B, C, D and E), several plasto-elastomeric compositions were prepared.

The EPDM elastomeric component was introduced first and, after a brief mastication (30 seconds, apparatus temperature 160° C.), the plastomeric component (polypropylene) and the plasticizer (paraffinic oil) were fed in the mixer. Mastication was continued until the polypropylene was melted and thus its full and homogenous dispersion in the rubber phase was achieved. Said operation requires about 2 minutes. Now the equipment temperature increases to 190° C. because of shear strain and friction. Then the crosslinking agents (phenolic resin and salicylic acid) were added. Mastication was continued until EPDM elastomer was fully crosslinked (about 5 minutes). The material temperature at the discharge from the mixer was about 200° C. The main physical and mechanical properties of the compositions thus obtained as well as the properties of the plastomers, elastomers and plasticizers mentioned in this example and the ASTM methods utilized for evaluating said properties are listed in Table 1.

TABLE 1

| Ingredients | Amount by weight based on 100 parts by weight of EPDM rubber | | | | |
|---|---|---|---|---|---|
| | A | B | C | D | E |
| EPDM | 100 | 100 | 100 | 100 | 100 |
| Polypropylene | 80 | 100 | 120 | 150 | 200 |
| Paraffinic oil | 100 | 90 | 80 | 100 | 120 |
| Phenolic resin | 10 | 10 | 10 | 10 | 11 |
| Salicylic acid | 3 | 3 | 3 | 3 | 3.2 |

Main physical and mechanical properties of the compositions measured on specimens obtained from injection moulded slabs.

| | A | B | C | D | E |
|---|---|---|---|---|---|
| Tensile strength Kg/cm$^2$ | 90 | 110 | 150 | 180 | 210 |
| Elongation at break, % | 300 | 345 | 500 | 540 | 590 |
| Shore hardness A, pts | 75 | 85 | 88 | — | — |
| Shore hardness A, pts | — | — | — | 35 | 45 |
| Crosslinked EPDM (% by weight) based on the total amount present in the composition | 98 | 99 | 97 | 99 | 98.5 |
| Tension set at 100%, % | 10 | 18 | 30 | 41 | 54 |

Ingredients characteristics

EPDM:
  bonded propylene content: 35% by weight
  bonded ethylene content: 59.5% by weight
  bonded diene-ENB content: 5.5% by weight
  Mooney viscosity at 121° C., ML (1'+4'): 65
  (ENB=ethylidene-norbornene)

Polypropylene:
  Melt index (ASTM D-1238/L) at 230° C. and 2.16 kg load=8.5 g/l
  Flexural modulus (ASTM D-790)=1200 Kg/cm$^2$
  Rockwell hardness (ASTM D-785/B)=94° R scale Paraffinic oil:
  paraffin content: 62% by weight
  naphtenic content: 28% by weight
  aromatic content: 10% by weight Test methods utilized for evaluating the above mentioned physical and mechanical properties Tensile strength and elongation at break: ASTM D-425/54
Shore hardness: ASTM 2240/68
% Crosslinked EPDM: xylene solubility at 130° C.
Tension set: ASTM D-412.

EXAMPLE 2

Example 1 was repeated but utilizing the following materials (elastomer, plastomer) with different physical properties.

EPDM:
  bonded propylene content: 45% by weight
  bonded ethylene content: 51.5% by weight
  bonded diene-ENB content: 3.5% by weight Polypropylene:
  Melt index: 0.75 g/10 min.
  Flexural modulus: 1350 kg/cm$^2$
  Rockwell hardness: 90°

The other ingredients and the ASTM methods employed for evaluating the physical and mechanical properties of the compositions thus obtained are as in Example 1. Said properties values of the thermoplastic compounds containing a thermodynamically crosslinked elastomeric phase are set forth in Table 2.

TABLE 2

| Ingredients | Amount by weight based on 100 parts by weight of EPDM rubber | | | | |
|---|---|---|---|---|---|
| | A | B | C | D | E |
| EPDM | 100 | 100 | 100 | 100 | 100 |
| Polypropylene | 30 | 80 | 110 | 200 | 300 |
| Paraffinic oil | 40 | 60 | 80 | 100 | 120 |
| Phenolic resin | 12.5 | 12.5 | 12.5 | 13 | 13 |
| Salicylic acid | 3.4 | 3.4 | 3.4 | 3.6 | 3.6 |

Main physical and mechanical properties of the compositions measured on specimens obtained from injection molded slabs.

| | A | B | C | D | E |
|---|---|---|---|---|---|
| Tensile strength kg/cm$^2$ | 55 | 70 | 120 | 180 | 195 |
| Elongation at break, % | 350 | 410 | 520 | 540 | 560 |
| Shore hardness A, pts | 70 | 78 | 85 | — | — |
| Shore hardness D, pts | — | — | — | 35 | 40 |
| Crosslinked EPDM (% by weight based on the total amount present in the composition | 99 | 99 | 98 | 99 | 99 |
| Tension set at 100%, % | 7 | 15 | 22 | 35 | 40 |

EXAMPLE 3

In this Example the following materials (elastomer, plastomer) having different physical and mechanical properties as compared with those of Examples 1 and 2 were employed.

EPDM:
  oil extended at 23% by weight with paraffinic oil;
  Bonded propylene content: 32% by weight per 100 parts by weight of pure polymer matrix (oil-free).
  Bonded ethylene content: 61% by weight per 100 parts by weight of pure polymer matrix (oil-free)
  Bonded diene-ENB content: 7% by weight per 100 parts by weight of pure polymer matrix (oil-free)

Polypropylene:
  random copolymer of 98% by weight of propylene and 2% by weight of polyethylene;
  Melt index: 6 g/10 min.
  Flexural modulus: 850 kg/cm$^2$
  Rockwell hardness: 79°

The other ingredients utilized in the compositions are as mentioned in the previous Examples 1 and 2.

The ingredients employed and the main physical and mechanical properties of the thermoplastic materials thus obtained are reported in Table 3.

TABLE 3

| Ingredients | Amount by weight per 100 parts by weight of oil-free EPDM | | | | |
|---|---|---|---|---|---|
| | A | B | C | D | E |
| EPDM | 130 | 130 | 130 | 130 | 130 |
| Polypropylene | 40 | 100 | 150 | 200 | 250 |
| Paraffinic oil | 10 | 25 | 50 | 60 | 80 |
| Phenolic resin | 8 | 8 | 8 | 8.5 | 9 |
| Salicylic acid | 2 | 2 | 2 | 2.2 | 2.5 |
| Main physical and mechanical properties of the compositions measured on specimens obtained from injection molded slabs | | | | | |
| Tensile strength kg/cm² | 60 | 85 | 140 | 185 | 210 |
| Elongation at break, | 400 | 430 | 480 | 500 | 530 |
| Shore hardness A, pts | 68 | 81 | — | — | — |
| Shore hardness D, pts | — | — | 40 | 50 | 62 |
| Crosslinked EPDM (% by weight) based on the total amount present in the composition | 95 | 95 | 96 | 92 | 97 |
| Tension set at 100%, % | 10 | 15 | 18 | 35 | 40 |

What we claim is:

1. A plasto-elastomeric composition comprising EPDM elastomers and polyolefins and having the elastomeric phase partially or fully crosslinked, wherein crosslinking is achieved by means of salicylic acid and a non-halogenated phenolic resin of formula

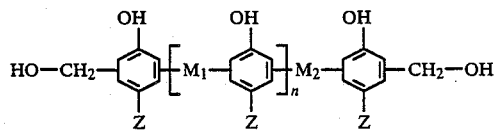

wherein $M_1$ and $M_2$, which may be the same or different, are —$CH_2$— or —$CH_2$—$CO$—$CH_2$— radicals, Z is an aryl or alkyl radical containing from 4 to 16 carbon atoms, and n is an integer from 0 to 6.

2. A plasto-elastomeric composition according to claim 1, wherein the phenolic resin is aphenol-formaldehyde resin of formula

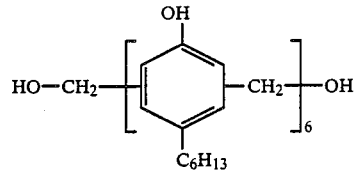

3. A plasto-elastomeric composition according to claim 1, wherein the olefinic monomer from which the polyolefin is obtained is selected from the group consisting of ethylene, propylene, butene-1, pentene-1, hexene-1, 4-methyl-1-pentene, 3-methyl-1-pentene, 3,3-dimethyl-1-butene, 3-methyl-1-hexene and 2,4,4-trimethyl-1-pentene.

4. A plasto-elastomeric composition according to claim 1, wherein the EPDM terpolymer consists of at least two olefinic monomers and a coniugated or not coniugated diene monomer.

5. A plasto-elastomeric composition according to claim 1, wherein the diene monomer is selected from the group consisting of ethylidene-norbornene, 1,4-hexadiene and dicyclopentadiene.

6. A plasto-elastomeric composition according to claim 1, wherein salicylic acid is present in the composition in an amount of from 0.05 to 12 parts by weight per 100 parts by weight of EPDM elastomer.

7. A plasto-elastomeric composition according to claim 1, wherein the salicylic acid: non-halogenated phenolic resin weight ratio is from 0.1:1 to 0.8:1.

8. A plasto-elastomeric composition according to claim 1 containing from 10 to 90% of polyoefin and from 90 to 10% EPDM terpolymer.

* * * * *